United States Patent
Li et al.

(10) Patent No.: US 10,254,601 B2
(45) Date of Patent: Apr. 9, 2019

(54) LIQUID CRYSTAL DISPLAY PANEL AND DISPLAY DEVICE INCLUDING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Li, Beijing (CN); Xin Li, Beijing (CN); Jinbo Ding, Beijing (CN); Bin Li, Beijing (CN); Bin Zhao, Beijing (CN); Xuchen Yuan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/503,256

(22) PCT Filed: Aug. 31, 2016

(86) PCT No.: PCT/CN2016/097580
§ 371 (c)(1),
(2) Date: Feb. 10, 2017

(87) PCT Pub. No.: WO2017/067325
PCT Pub. Date: Apr. 27, 2017

(65) Prior Publication Data
US 2018/0335657 A1  Nov. 22, 2018

(30) Foreign Application Priority Data

Oct. 23, 2015 (CN) .......................... 2015 1 0698108

(51) Int. Cl.
*G02F 1/1345* (2006.01)
*G02F 1/1335* (2006.01)
(Continued)

(52) U.S. Cl.
CPC .............. *G02F 1/1345* (2013.01); *C09J 9/02* (2013.01); *G02F 1/1335* (2013.01);
(Continued)

(58) Field of Classification Search
CPC ..................................................... G02F 1/1345
(Continued)

(56) References Cited

U.S. PATENT DOCUMENTS 9,323,100 B1 * 4/2016 Feng ................. G02F 1/133514
2013/0088672 A1 * 4/2013 Shin .................. G02F 1/133512
349/110
(Continued)

FOREIGN PATENT DOCUMENTS

CN       103048824 A    4/2013
CN       103926739 A    7/2014
(Continued)

OTHER PUBLICATIONS

First Office Action for Chinese Application No. 201510698108.7, dated Oct. 11, 2017, 6 Pages.
(Continued)

*Primary Examiner* — Jami Valentine Miller
(74) *Attorney, Agent, or Firm* — Brooks Kushman P.C.

(57) ABSTRACT

A display panel and a display device are provided. The display panel includes an array substrate, a color filter substrate arranged opposite to the array substrate, and an electrically conductive first connector. A common electrode is arranged on the array substrate, and a black matrix layer is arranged on a side of the color filter substrate facing the array substrate, and the first connector electrically connects
(Continued)

A-A at least a part of the black matrix layer to the common electrode.

15 Claims, 3 Drawing Sheets

(51) Int. Cl.
  *G02F 1/1343* (2006.01)
  *C09J 9/02* (2006.01)
(52) U.S. Cl.
  CPC ...... *G02F 1/1343* (2013.01); *G02F 1/133512* (2013.01); *G02F 1/133514* (2013.01); *G02F 2201/121* (2013.01); *G02F 2201/503* (2013.01); *G02F 2202/22* (2013.01); *G02F 2202/28* (2013.01)
(58) Field of Classification Search
  USPC .......................................................... 257/72
  See application file for complete search history.

(56) References Cited

U.S. PATENT DOCUMENTS

2014/0184966 A1\* 7/2014 Ogasawara ........... G02F 1/1345
  349/33
2014/0340605 A1  11/2014 Takeda et al.

FOREIGN PATENT DOCUMENTS

| CN | 103941459 A | 7/2014 |
| CN | 104503131 A | 4/2015 |
| CN | 105182599 A | 12/2015 |

OTHER PUBLICATIONS

International Search Report and Written Opinion for Application No. PCT/CN2016/097580, dated Nov. 1, 2016, 11 Pages.

\* cited by examiner

A-A

B-B

A-A

B-B

LIQUID CRYSTAL DISPLAY PANEL AND DISPLAY DEVICE INCLUDING THE SAME

CROSS-REFERENCE TO RELATED APPLICATIONS

This application is the U.S. national phase of PCT Application No. PCT/CN2016/097580 filed on Aug. 31, 2016, which claims priority to Chinese Patent Application No. 201510698108.7 filed on Oct. 23, 2015, the disclosures of which are incorporated in their entirety by reference herein.

TECHNICAL FIELD

The present disclosure relates to the field of display technology, and in particular to a display panel and a display device including the display panel.

BACKGROUND

A liquid crystal display panel includes an array substrate and a color filter substrate which is arranged opposite to the array substrate to form a cell. The color filter substrate is susceptible to external environments such that static charges may be accumulated on a surface of the color filter substrate away from the array substrate. In case that an amount of the static charges reaches a certain level, an original electric field within the liquid crystal display panel may be disturbed, and thereby display effects may be adversely affected.

SUMMARY

An object of the present disclosure is to provide a display panel and a display device, so as to prevent an electric field within the display panel from being disturbed and display effects from being adversely affected.

In one aspect, the present disclosure provides a display panel including an array substrate, a color filter substrate arranged opposite to the array substrate, and an electrically conductive first connector. A common electrode is arranged on the array substrate, a black matrix layer is arranged on a side of the color filter substrate facing the array substrate, and the first connector electrically connects at least a part of the black matrix layer to the common electrode.

Optionally, the display panel further includes an electrically conductive second connector, wherein a low level signal terminal is further arranged on the array substrate, a transparent antistatic layer is arranged on a side of the color filter substrate away from the array substrate, and the second connector electrically connects at least a part of the antistatic layer to the low level signal terminal, and the black matrix layer is separated and insulated from the second connector.

Optionally, the black matrix layer is divided into a first black matrix portion and a second black matrix portion separated and insulated from each other, the second black matrix portion is adjacent to the second connector, and the first back matrix portion is electrically connected to the first connector.

Optionally, a first notch is formed in the black matrix layer, and the first notch is adjacent to the second connector.

Optionally, the antistatic layer is divided into a first antistatic portion and a second antistatic portion separated and insulated from each other, the first antistatic portion is adjacent to the first connector, and the second antistatic portion is electrically connected to the second connector.

Optionally, a second notch is formed in the antistatic layer, and the second notch is adjacent to the first connector.

Optionally, a portion of the array substrate extends beyond an edge of the color filter substrate and forms a binding region, wherein both the first connector and the second connector are arranged on the binding region.

Optionally, the first connector and the second connector are arranged at two ends of the binding region, respectively.

Optionally, both the first connector and the second connector are made of a silver conductive adhesive.

In another aspect, the present disclosure provides a display device including the above-mentioned display panel.

In the present disclosure, at least a portion of the black matrix layer is electrically connected to the common electrode via the first connector. Thus, no potential difference may be generated between the common electrode and the portion of the black matrix layer electrically connected to the common electrode. As a result, disturbance to an electric field between the common electrode and a pixel electrode may be reduced, and thereby display effects of the display panel are improved.

BRIEF DESCRIPTION OF THE DRAWINGS

The following drawings are provided to facilitate understanding of the present disclosure, and constitute a part of the description. The drawings and the following embodiments are used for illustrative purposes only, but may not be construed as limitations to the present disclosure.

Figure 1:
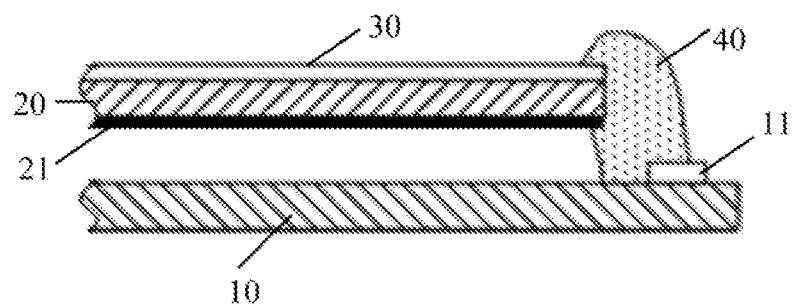
FIG. 1 is a sectional view of a portion of a display panel in related art.

REFERENCE SIGN LIST 10 array substrate
10a binding region
11 low level signal terminal
12 common signal terminal
20 color filter substrate
21 black matrix layer
211 first black matrix portion
212 second black matrix portion
30 antistatic layer
31 first antistatic portion
32 second antistatic portion
40 connector
41 first connector
42 second connector
51 first notch
52 second notch

DETAILED DESCRIPTION

Specific embodiments of the present disclosure will be described hereinafter in conjunction with the drawings. It may be understood that the specific embodiments described herein are used for illustrating and explaining the present disclosure only, but are not used to limit the scope of the present disclosure.

FIG. 1 is a sectional view of a portion of a display panel in related art. As shown in FIG. 1, in related art, an antistatic layer 30 which is electrically conductive is arranged on a side of a color filter substrate 20 away from an array substrate 10, and is connected to a low level signal terminal 11 via a connector 40.

A black matrix layer 21 is arranged on a side of the color filter substrate 20 facing the array substrate 10. The black matrix layer 21 is a conductor having a relatively low resistivity, and is susceptible to external environments and thereby generates electric charges. For example, when a silver conductive adhesive is dripped between the array substrate 10 and the color filter substrate 20 to form the connector 40, the silver conductive adhesive may be in contact with the black matrix layer 21, causing that the black matrix layer 21 is electrically connected to the low level signal terminal 11 and thus a potential difference is generated between the black matrix layer 21 and a common electrode. Due to this potential difference, an electric field between the common electrode and a pixel electrode may be disturbed. As a result, such a phenomenon as "greenish screen" or "purplish screen" may occur, thereby adversely affecting display effects.

Figure 2:
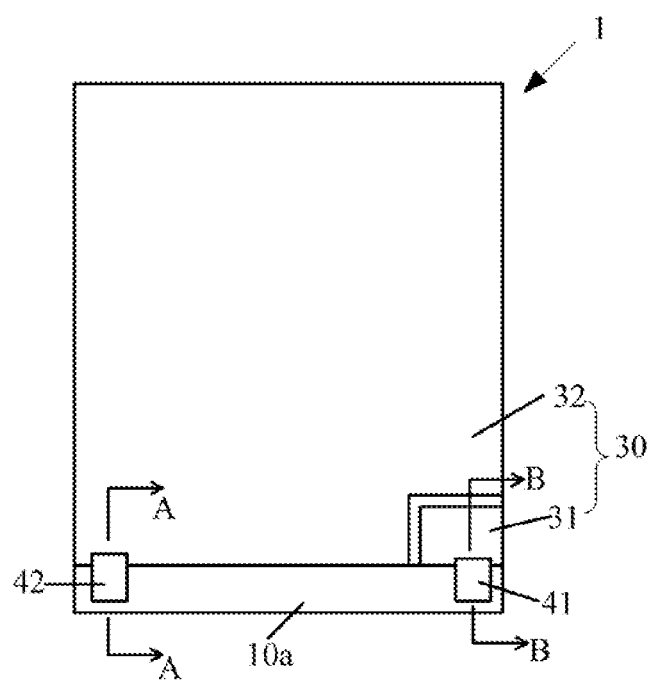
FIG. 2 is a top view of a display panel according to at least one embodiment of the present disclosure.
Figure 3:
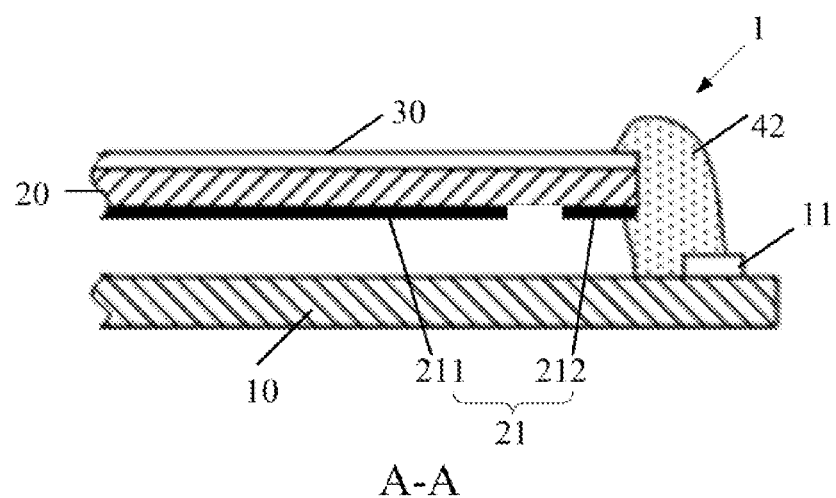
FIG. 3 is a sectional view of the display panel taken along a line A-A in FIG. 2.
Figure 4:
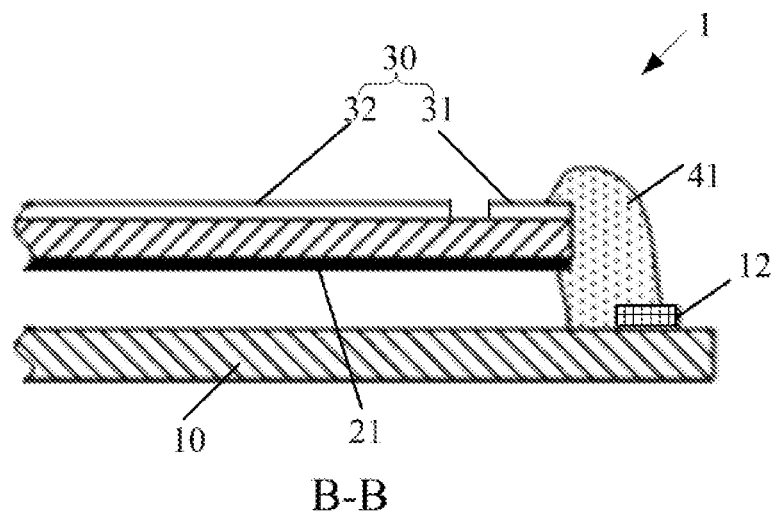
FIG. 4 is a sectional view of the display panel taken along a line B-B in FIG. 2.

FIG. 2 to FIG. 4 are schematic diagrams of a display panel provided by the present disclosure. As shown in FIG. 2 to FIG. 4, at least one embodiment of the present disclosure provides a display panel 1. The display panel 1 includes an array substrate 10 and a color filter substrate 20 arranged opposite to the array substrate 10, and a common electrode (not shown) is arranged on the array substrate 10. A black matrix layer 21 is arranged on a side of the color filter substrate 20 facing the array substrate 10. The display panel 1 further includes a first connector 41. The first connector 41 is electrically conductive and electrically connects at least a part of the black matrix layer 21 to the common electrode. In FIG. 4, a common signal terminal 12 for providing a common voltage signal to the common electrode is arranged on the array substrate 10, and the black matrix layer 21 is electrically connected to the common electrode, i.e., the black matrix layer 21 is electrically connected to the common signal terminal 12.

In the embodiments of the present disclosure, at least a part of the black matrix layer 21 is electrically connected to the common electrode via the first connector 41. Therefore, no potential difference exists between the common electrode and the part of the black matrix layer 21 electrically connected to the common electrode. As a result, disturbance to an electric field between the common electrode and a pixel electrode may be reduced, and display effects of the display panel may be improved.

Further, as shown in FIG. 3, a low level signal terminal 11 is arranged on the array substrate 10, and a transparent antistatic layer 30, e.g., an indium tin oxide (ITO) layer, is arranged on a side of the color filter substrate 20 away from the array substrate 10. The display panel 1 further includes a second connector 42. The second connector 42 is electrically conductive and electrically connects at least a part of the antistatic layer 30 to the low level signal terminal 11. The black matrix layer 21 is separated and insulated from the second connector 42. The low level signal terminal 11 may be grounded. When static charges are accumulated on a surface of the color filter substrate 20 due to the external environments, the static charges may be transferred to the low level signal terminal 11 via the second connector 42, so as to prevent the electric field within the display panel from being adversely affected by excessive static charges.

Specifically, the first connector 41 and the second connector 42 may be made of a silver conductive adhesive, so as to ensure excellent conductivity and adhesivity.

The black matrix layer 21 is separated and insulated from the second connector 42, so as to present the common electrode from being indirectly connected to the low level signal terminal 11 and thereby to prevent the common voltage signal applied to the common electrode from being changed.

In order to ensure that the black matrix layer 21 is insulated from the second connector 42, as shown in FIG. 3, the black matrix layer 21 is divided into a first black matrix portion 211 and a second black matrix portion 212 separated and insulated from each other. The second black matrix portion 212 is adjacent to the second connector 42, and the first black matrix portion 211 is electrically connected to the first connector 41. An area of the second black matrix portion 212 may be much smaller than that of the first black matrix portion 211, and merely a small part of the black matrix layer 21 adjacent to the second connector 42 may be formed as the second black matrix portion 212. Since the second black matrix portion 212 is separated and insulated from the first black matrix portion 211, the first black matrix portion 211 may not be electrically connected to the low level signal terminal 11, even if the second connector 42 is in contact with the second black matrix portion 212 due to process errors during forming the second connector 42. Therefore, a potential difference between the first black matrix portion 211 and the common electrode is prevented from being generated. The word "adjacent to" herein refers to projections of two portions onto a horizontal plane are close to each other.

Figure 5:
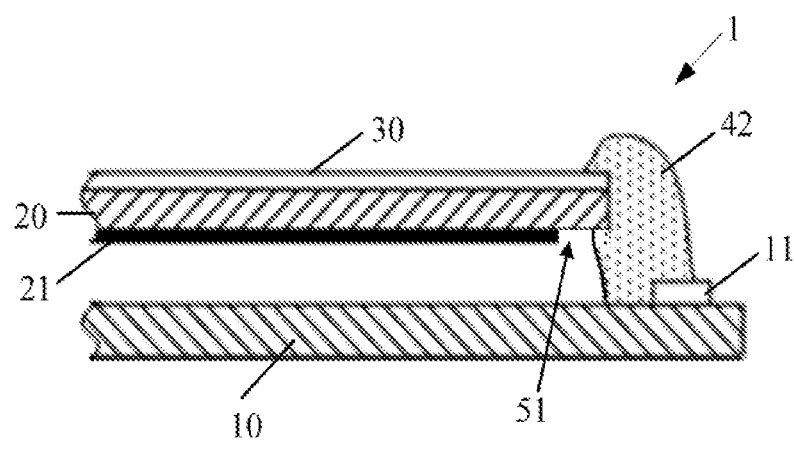
FIG. 5 is a sectional view of a portion of the display panel according to at least one embodiment of the present disclosure.

FIG. 5 is a sectional view of another example of the black matrix layer 21 of the present disclosure. A position shown in FIG. 5 is the same as that shown in FIG. 3, i.e., taken along a line A-A in FIG. 2. A first notch 51 is formed in the black matrix layer 21, and the first notch 51 is adjacent to the second connector 42. Hence, during forming the second connector 42, existence of the first notch 51 may prevent the black matrix layer 21 from being connected to the low level signal terminal 11 via the second connector 42. A shape of the first notch 51 may be rectangular, semi-circular, polygonal and so on, as long as the second connector 42 may be separated and insulated from the black matrix layer 21.

In order to simplify processes, in case that both the first connector 41 and the second connector 42 are made of the silver conductive adhesive, the silver conductive adhesive may be simultaneously dripped to positions where the first connector 41 and the second connector 42 are arranged, possibly resulting in contact of the first connector 41 with the antistatic layer 30. Furthermore, because the first connector 41 is electrically connected to the common electrode and the antistatic layer 30 is electrically connected to the low level signal terminal 11, the common electrode may be electrically connected to the low level signal terminal 11 once the first connector 41 is in contact with the antistatic layer 30. At this time, the common voltage signal applied to the common electrode may be maintained at a low level, and an image may not be displayed normally. In order to prevent such a phenomenon from happening, as shown in FIG. 4, the antistatic layer 30 is divided into a first antistatic portion 31 and a second antistatic portion 32 separated and insulated from each other. the first antistatic portion 31 is adjacent to the first connector 41, and the second antistatic portion 32 is electrically connected to the second connector 42. In this way, even if the first antistatic portion 31 is electrically in contact with the first connector 41 due to the process errors, the common electrode may still not be electrically connected to the low level signal terminal 11 since the first antistatic portion 31 is separated and insulated from the second antistatic portion 32.

Figure 6:
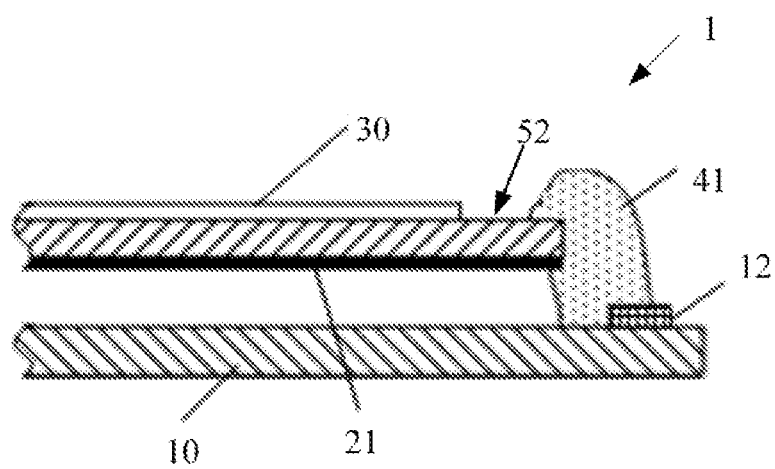
FIG. 6 is a sectional view of a portion of the display panel according to at least one embodiment of the present disclosure.

Another example of the antistatic layer 30 is shown in FIG. 6. A position shown in FIG. 6 is the same as that shown in FIG. 4, i.e., taken along the line B-B in FIG. 2. A second notch 52 is formed in the antistatic layer 30, and the second notch 52 is adjacent to the first connector 41. In this way, the first connector 41 may be prevented from being in contact with the antistatic layer 30, thereby preventing the common electrode from being electrically connected to the low level signal terminal 11.

It may be understood that, as shown in FIG. 2, the first connector 41 is separated from the second connector 42, so as to prevent them from being electrically connected to each other. In other words, projections of the first antistatic portion 31 and the second black matrix portion 212 onto the array substrate 10 are separated from each other.

As shown in FIG. 2, a part of the array substrate 10 is covered by the color filter substrate 20, and the remaining part of the array substrate 10 extends beyond an edge of the color filter substrate 20 and forms a binding region 10a. The binding region 10a is used for connection with a circuit board, and both the first connector 41 and the second connector 42 are arranged on the binding region 10a.

The first connector 41 and the second connector 42 may be arranged at two ends of the binding region 10a, respectively. In other words, in case that the first notch 51 is formed in the black matrix layer 21 to be adjacent to the second connector 42, the first notch 51 is located at a corner of the black matrix layer 21 adjacent to the binding region 10a and the second connector 42; and in case that the second notch 52 is formed in the antistatic layer 30 to be adjacent to the first connector 41, the second notch 52 is located at a corner of the antistatic layer 30 adjacent to the binding region 10a and the first connector 41, so as to facilitate forming the first notch 51 and the second notch 52. In case that the black matrix layer 21 is divided into the first black matrix portion 211 and the second black matrix portion 212, the second black matrix portion 212 is located at the corner of the black matrix layer 21 adjacent to the binding region 10a and the second connector 42, so as to facilitate dividing the first black matrix portion 211 and the second black matrix portion 212. In case that the antistatic layer 30 is divided into the first antistatic portion 31 and the second antistatic portion 32, the first antistatic portion 31 is located at the corner of the antistatic layer 30 adjacent to the binding region 10a and the first connector 41, so as to facilitate dividing the first antistatic portion 31 and the second antistatic portion 32.

It may be understood that, because the antistatic layer 30 is connected to the low level signal terminal 11 in the display panel in the present disclosure, static charges may be prevented from being accumulated on the color filter substrate 20 due to the external environments, and thereby the electric field within the display panel may be prevented from being disturbed. In addition, since the black matrix layer 21 is electrically connected to the common electrode, an equipotential may be formed between the black matrix layer 21 and the common electrode, i.e., no electric field may be formed therebetween. At this time, the electric field between the pixel electrode and the common electrode may not be disturbed and deflections of liquid crystal molecules may not be adversely affected, thereby improving the display effects. Furthermore, because the black matrix layer 21 is divided into the second black matrix portion 212 and the first black matrix portion 211 separated and insulated from the second black matrix portion 212, and the antistatic layer 30 is divided into the first antistatic portion 31 and the second antistatic portion 32 separated and insulated from each other, it may still be ensured that a voltage applied to the first black matrix portion 211 is equal to the voltage applied to the common electrode even if the second connector 42 is in contact with the second black matrix portion 212, and thereby the deflections of the liquid crystal molecules may not be adversely affected. As a result, the display panel in the present disclosure may achieve excellent display effects, and such a phenomenon as "greenish screen" or "purplish screen" may be eliminated.

In some embodiments of the present disclosure, the present disclosure further provides a display device including the above-mentioned display panel. Of course, the display device may further include such structures as a backlight source and a power source.

The display device may be any product or member with a display function enabled, such as a mobile phone, a tablet, a television, a display, a laptop, a digital photo frame or a navigator.

The display panel provided in the present disclosure may prevent the electric field between the common electrode and the pixel electrode from being disturbed and improve the display effects. Thus, the display device in the present disclosure may achieve the excellent display effects.

It may be understood that the above embodiments are merely illustrative embodiments of the present disclosure for illustrating principles of the present application. However, the present disclosure is not limited thereto. Obviously, one skilled in the art may make various modifications and improvements without departing from the spirit of the present disclosure, and these modifications and improvements also fall within the scope of the present disclosure.

What is claimed is:

1. A display panel, comprising:
an array substrate, a common electrode being arranged on the array substrate;
a color filter substrate arranged opposite to the array substrate, a black matrix layer being arranged on a side of the color filter substrate facing the array substrate;
a first connector, the first connector being electrically conductive and electrically connecting at least a part of the black matrix layer to the common electrode; and
a second connector, the second connector being electrically conductive,
wherein a low level signal terminal is further arranged on the array substrate, a transparent antistatic layer is arranged on a side of the color filter substrate away from the array substrate, the second connector electrically connects at least a part of the antistatic layer to the low level signal terminal, and the black matrix layer is separated and insulated from the second connector, and
a portion of the array substrate extends beyond an edge of the color filter substrate and forms a binding region, and both the first connector and the second connector are arranged on the binding region.

2. The display panel according to claim 1, wherein the black matrix layer is divided into a first black matrix portion and a second black matrix portion separated and insulated from each other, the second black matrix portion is adjacent to the second connector, and the first back matrix portion is electrically connected to the first connector.

3. The display panel according to claim 1, wherein a first notch is formed in the black matrix layer, and the first notch is adjacent to the second connector.

4. The display panel according to claim 1, wherein the antistatic layer is divided into a first antistatic portion and a second antistatic portion separated and insulated from each other, the first antistatic portion is adjacent to the first connector, and the second antistatic portion is electrically connected to the second connector.

5. The display panel according to claim 1, wherein a second notch is formed in the antistatic layer, and the second notch is adjacent to the first connector.

6. The display panel according to claim 1, wherein the first connector and the second connector are arranged at two ends of the binding region, respectively.

7. The display panel according to claim 1, wherein both the first connector and the second connector are made of a silver conductive adhesive.

8. A display device, comprising:
the display panel according to claim 1.

9. The display panel according to claim 2, wherein both the first connector and the second connector are made of a silver conductive adhesive.

10. The display device according to claim 8, wherein the black matrix layer is divided into a first black matrix portion and a second black matrix portion separated and insulated from each other, the second black matrix portion is adjacent to the second connector, and the first back matrix portion is electrically connected to the first connector.

11. The display device according to claim 8, wherein a first notch is formed in the black matrix layer, and the first notch is adjacent to the second connector.

12. The display device according to claim 8, wherein the antistatic layer is divided into a first antistatic portion and a second antistatic portion separated and insulated from each other, the first antistatic portion is adjacent to the first connector, and the second antistatic portion is electrically connected to the second connector.

13. The display device according to claim 8, wherein a second notch is formed in the antistatic layer, and the second notch is adjacent to the first connector.

14. The display device according to claim 8, wherein the first connector and the second connector are arranged at two ends of the binding region, respectively.

15. The display device according to claim 8, wherein both the first connector and the second connector are made of a silver conductive adhesive.

\* \* \* \* \*